United States Patent Office 3,453,171
Patented July 1, 1969

3,453,171
EMBOSSED PLASTIC SURFACE COVERINGS AND METHOD OF PREPARING SAME
Richard P. Crowley, Milton, Mass.
(23 Salem Road, Wellesley, Mass. 02181)
No Drawing. Filed Apr. 8, 1966, Ser. No. 541,100
Int. Cl. B32b 3/26, 27/30
U.S. Cl. 161—159   9 Claims

ABSTRACT OF THE DISCLOSURE

Embossed cellular polymeric sheet material is formed by providing a gas-retentive polymeric sheet material containing a blowing agent, irradiating a preselected portion of the sheet to cross-link the resin and then heating to decompose the blowing agent.

---

My invention relates to chemically embossed, cellular, polymeric surface coverings and particularly concerns a method for producing a cellular, thermoplastic surface covering having a relief or embossed pattern thereon.

The preparation of textured or embossed, cellular or foam polymeric material for wall coverings, upholstery, floor coverings, decorative ribbons, and the like, is a matter of considerable interest. Expanded plastic yard goods such as vinyl yard goods with a decorative relief pattern made by embossing and having the printed design in the embossed valleys have been made in the past by several printing processes known in the trade as valley printing, spanishing, and the like. In these processes the decorative design is imparted onto the surface of the material after the expansion of the polymeric material of the sheeting has taken place. The embossed decorative design formed is usually top-coated with a composition to enhance the abrasion resistance of the surface, to impart additional and colorful design effects, or to provide further protection agains degradation from light or the like. Most commonly clear transparent coatings are applied to the surface by conventional methods like spraying, roller coating, roto-gravure coating and curtain coating. Coating of the decorative relief surface has often proven unsuccessful or unsatisfactory since the conventional methods deposit a nonuniform, protective film on the design. This film has a tendency to fill in the valleys of the embossed surface design and to leave a thin film or no film on the high areas or peaks of the design and excessive coating in the low or embossed areas.

One method to overcome some of the disadvantages in the fabrication of expanded plastic covering has been suggested in U.S. Patents 3,293,094 and 3,293,108. This method involves the use of an inhibiting agent which alters the decomposition temperature of the blowing agent in the thermoplastic material which is to be expanded. Although this technique is satisfactory for some purposes, inhibition of the decomposition temperature of the blowing agent is accomplished through the mechanism of chelation or reaction with certain metal salt activators in particular areas of the film. These activators are additives usually employed with the blowing agent the normally lower the decomposition temperature of the chemical blowing agent by their presence in the plastic. Such activators include the metal salts of zinc, cadmium, tin, lead, and combinations thereof. To provide a suitable or deep embossing pattern the inhibiting agents must penetrate a gelled or semirigid plastic film and contact the activators. The degree of embossing thus depends upon the degree of penetration which also depends upon the particular selection of the solvent system employed, the degree of gellation of the resin, and the amount and type of activator and inhibitor used.

It is an object of my invention to provide a new and unique method of chemically embossing cellular plastic surface coverings such as vinyl chloride resin floor coverings.

Another object is to provide a method of chemically embossing plastic sheet material, which method avoids the absolute necessity of having a metal activator in the plastic film, and other difficulties associated with prior art methods.

A further object of my invention is to provide textured or embossed cellular plastic material such as vinyl chloride surface or polyolefin coverings, particularly where the amount of embossed area represents a minor amount of the total surface area of the surface covering.

Other objects and advantages of my invention will be apparent to those persons skilled in the art from the following more detailed description of my invention.

Briefly, my invention comprises inhibiting or preventing the expansion fo a plastic material in particularly designated areas through the use of a hardening agent or treatments applied to those areas prior to or with expansion of the plastic material. The inhibition of or prevention of full expansion of the plastic material in a particular area is accomplished without regard to the absence or presence of any activators or other additives in the film which alter the decomposition temperature or activation of the blowing agent. In one embodiment of my invention the hardening or modifying angent may be applied in a solvent to a flat, porous, semi-rigid or gelled surface of the plastic material containing a blowing agent in the particular decorative or designed pattern form in which inhibition of expansion is desired. My hardening agents may be incorporated in conventional type liquid printing inks or solvent solutions. My hardening agents may be incorporated in oil, glycol, wax, or resin based printing inks containing a volatile or non-volatile solvent or both, as well as into liquid organic solvents which may be applied to the flat surface of the plastic material containing a blowing agent.

Typical hardening agents which may be employed include cross-linking or modifying agents such as, for example, azo compounds, nitrile compounds, peroxides, and the like, depending upon the particular plastic material employed. My hardening agent should be used in an amount sufficient to modify the properties of the plastic material with which the hardening agent contacts, and to inhibit or prevent the full expansion of the cellular layer upon decomposition of the blowing agent in the film. Typically, my hardening agents may be used in an amount of from 0.1 to 20 percent by weight or more of the plastic material. My hardening agents should preferably cross-link, or otherwise modify the plastic properties so as to render the material less thermoplastic (i.e., more thermosetting) or gas-expandable at or above the temperature or tempeature range at which the plastic material is expanded into a cellular layer. In this manner those areas of the plastic film not exposed to my hardening agent will expand as normally upon the decomposition of the chemical blowing agent, while those areas on the surface and directly beneath the surface to a controlled depth of penetration of where the hardening agent has been contacted will be inhibited in full expansion and, therefore, become depressed or embossed areas with a smaller or different cellular foam structure thereunder than the remaining cellular structure.

The amount and extent of the embossing depression will depend upon the hardening agent selected, the degree of penetration of the agent into the film prior to expansion thereof, and the nature of the plastic material. Where deep embossing, such as greater than 5 to 20 mils or more in depth, is desired a solvent system should be selected which permits the hardening agent dissolved therein to penetrate the plastic surface to a greater depth so that a greater depth of thickness of the plastic material is modified. Typical organic solvents which may be employed include alcohols, ethers, ketones, aldehydes, esters, hydrocarbons and the like. Diluents such as toluene, cyclohexane, petroleum, naphtha, xylene and the like may be used with the solvent. A highly active solvent such as methylethyl ketone, acetone or tetrahydrofuran, cyclohexanone, and the like are preferred where good relief depressions are desirable. Good results are achieved when the solvent selected also acts as a dispersant or solvent or softening agent for the plastic resin or material which is to be expanded.

My hardening agents and solvent compositions containing the agents may be printed, sprayed, coated or otherwise deposited on the surface of the plastic material to be expanded, preferably while the plastic material has a flat, smooth top surface, i.e., prior to any embossed pattern being created thereon.

The expandable polymeric or plastic layers on which my hardening agents may be employed include any organo plastic, gas-retentive and gas-expandable polymers or synthetic resin materials. Such polymeric materials include, but are not limited to, vinyl resin such as vinyl chloride resins like polyvinyl chloride and copolymers of vinyl chloride with vinyl acetate, polyolefins like polyethylene, polypropylene, ethylene-propylene resins, ethylene-butene resins, and the like, acrylic resins, urethane resins, styrene resins and modified styrene resins like polystyrene, acrylonitrile-butadiene-styrene (ABS) resins, etc. These thermoplastic materials may be formed into thin sheets by coating, casting, calendering, extruding, or other operations. The resulting surface coatings may be supported or unsupported sheet materials. For example, expanded vinyl chloride resin fabrics with a fabric base for use as clothing may be used, as well as vinyl chloride resin containing a felt, asbestos fiber or glass mesh or fiber base for use as floor sheeting material is included.

The surface of the plastic sheet after contact with my hardening agent and before or after heating and expansion may be coated with a thin (e.g., 1 to 20 mil) clear or colored coating layer, e.g., a decorative or protective coating layer. Typical coating composition would include organic solvent solutions of vinyl chloride resins, or liquid acrylic resins, urethane resins, or other wear-resistant polymeric materials where a floor covering is to be formed. If a variety of different and unique embossing designs are desired, a series of the same or different hardening agents in the same or different solvent or volatile liquid may be applied one over the other to obtain variation in designs, depth of embossing patterns and other effects. In general, the cellular nature of the foam sheet will consist of substantially and essentially closed cells especially where the process concerns floor covering. However, flexible, thin, foam sheets of essentially interconnecting open cells may be formed where moisture or gas permeability or breathability of the sheet is a desirable feature of the material such as in clothing applications. The cells in the area of inhibited or full expansion will be different, e.g., typically larger in average cell size or diameter with thinner cell walls, due to the more thermoplastic nature of the polymer in this area and the greater cell expansion in this area. The cells in the modified area will be smaller with generally thicker cell walls, while the plastic material will be more thermoset and more solvent-resistant than the unmodified plastic material. My hardening agents may be admixed with or used before or after the inhibiting agents like citric, tartaric and oxalic acids and the like used to vary the decomposition temperature of the blowing agent. For example, where enhanced and very deep embossing is desired with, for example, a reduction in solvent usage my hardening agent may be added to a vinyl ink composition or solvent containing say citric acid and the solution applied in a particular pattern to a gelled vinyl resin layer containing a blowing agent and a metal salt activator. This combination of cross-linking and varying of the decomposition temperature provides good embossing designs and avoids some difficulties associated with the use of very active resin solvents and mitigates the need for very deep penetration of the gelled resin layer.

My hardening agents have been described as directed toward the resin or polymer in which the chemical blowing agent has been incorporated. However, the hardening, crosslinking, modifying or other hardening agent may be selected to harden the plasticizer which is incorporated with the resin, a polymer additive to the resin, or any other ingredient of the total resin composition from which the cellular layer is to be formed. For example, a polymer or resin additive may be added in appropriate amounts to any polymer containing a chemical blowing agent where the additive polymer is more easily susceptible to cross-linking, curing and the like by conventional or available cross-linking or hardening agents. A polymer, plastic, resin or rubber may be added to the total resin composition which is compatible with the primary resin, say in amounts of from 5 to 50 more percent. For example, acrylate resins such as alkyl esters of acrylic acid or methacrylic acid may be used as well as styrene resins like polystyrene and styrene based copolymers which are cross-linked by the use of conventional peroxide curing agents such as dicumyl peroxide. Natural and synthetic elastomers like styrene-butadiene copolymers, rubbery ethylene-propylene copolymers and diene modified terpolymers, polybutadiene, etc. may be incorporated and modified by conventional curing agents like zinc oxide, sulfur, etc. to inhibit expansion of the plastic material. The amount of resins and rubber employed as additives may be varied depending upon the degree and depth of embossing desired.

The polymeric composition containing the chemical blowing agent may be hardened by cross-linking the backbone of the polymer chain. For example, polyvinyl chloride resin may be cross-linked by the use of imides and amides and the like, or acrylates added to the polyvinyl chloride resin and peroxides or azodiisopropyl nitrile employed as hardening agents. Further, for example, with vinyl halide resin plastisols and organisols or any plasticized resin or polymer particles the plasticizer may be subject to cross-linking in order to increase the thermosetting properties and reduce the expansion of the resin in particular sheet areas. Pyromellitic anhydride or its salts or the like may be employed as a cross-linking agent for various ester and polyester-type plasticizers such as epoxidized soybean oil employed as a plasticizer in vinyl chloride resin plastisols. Other polyesters used as plasticizers, such as the sebacates, phthalates and adipates obtained by the reaction of the acid with a di-functional alcohol, such as ethylene glycol, or a fatty alcohol may be cross-linked in order to provide embossing properties. As described, my hardening agent thus may be directed toward the polymer itself, monomeric or polymeric plasticizers employed in the polymer, a resin or rubber additive to the polymer, or to any additive incorporated into the polymer wherein the hardening agent will modify the properties to inhibit expansion of the sheet material upon decomposition of the chemical blowing agent.

Some hardening agents which may be employed in the practice of my invention are described in U.S. Patents 2,518,249, 3,137,745, 3,141,867, 3,188,305 and 3,211,677 hereby incorporated by reference. Organic peroxides like phenyl substituted butyl benzoyl peroxide and aliphatic peroxides like dicumyl peroxide may be used as the hardening agent.

In addition, my hardening agents include the use of a beam from atomic or sub-atomic charged or neutral particles i.e., radiation to modify and harden the resin. For example, the polymeric sheet containing the blowing agent may be irradiated in a particular design and subsequently heated to create an embossed effect. A polyolefin resin like thin polyethylene or polypropylene resin containing azodicarbonamide may be irradiated with a beam of charged electrons or particles from a radioactive source or a Van der Graaf generator for a time sufficient to cross-link and modify the resin properties. The particular design to be embossed may be formed in a lead or other radiation imperforate shield placed between the sheet and the radiation source.

My discovery is particularly applicable to those embossed surface coatings and techniques wherein a minor or small portion of the area, e.g., 1 to 20 percent, is to be prevented or inhibited in expansion. The prevention of expansion of large areas requires larger amounts of hardening agents and may alter the desirable plastic properties of the surface. For example, compositions containing my hardening agents may be used to print the groove lines in an imitation brick or stone-type floor tile material onto a gelled vinyl chloride resin layer in order to prevent full expansion of the vinyl chloride resin in the groove line areas.

A typical printing ink composition in which my hardening agents may be used include those printing inks which include a film former or binder such as wax, resin, a coloring or pigment material such as carbon black and the like, a solvent for the film forming material such as a ketone or an ester and a dispersing or diluent such as a hydrocarbon solvent like toluene, xylene or the like. For use on gelled vinyl resin layers active solvents would include aliphatic and aromatic ketones like methylethyl ketone, cyclohexanone, tetrahydrofuran, ethylene dichloride, methylene chloride, nitropropane and the like.

The chemical blowing agents used to expand the plastic layer may include any gas, liquid or solid blowing agent or means. Typical blowing agents would include urea, biuret, carbonates like sodium bicarbonate, ammonium bicarbonate, metal hydrides, sulfonyl hydrides, azo compounds, and the like. A commonly used chemical blowing agent for vinyl resins and polyolefins is azodicarbonamide, which is typically employed in an amount from 1 to 30 parts of azodicarbonamide per 100 parts of resin. Azodicarbonamide decomposes in air in about 190 to 195° C., and lower in a plasticizer solution or where activators are employed. My hardening agents to be effective in inhibiting the full expansion of the plastic material must modify (cross-link or harden) the particular plastic surface area at about or below the temperature at which the chemical blowing agent begins to decompose and to expand the plastic material. Accordingly, those hardening agents which are activated by heating at temperatures of from the true decomposition temperature of the chemical blowing agent to 100° C. such as 50° C. lower, should be selected. The hardening agent used should permit the normal processing or treatment of the plastic material desirable until the foaming step is reached. The hardening agent may be applied at any time after the formation of the sheet material, but typically is applied to the flat surface just prior to heating and decomposing the blowing agent.

For the purposes of illustration only my discovery will be described in connection with the inhibition of a vinyl chloride resin employing as hardening agents an organic cross-linking agent for the vinyl chloride resin in a printing ink.

Example 1

A typical vinyl resin plastisol composition is prepared as follows.

| Ingredients: | Parts by wt. |
| --- | --- |
| Polyvinyl resin dispersion grade | 100.0 |
| Dioctylphthalate (plasticizer) | 70.0 |
| Epoxidized soybean oil (plasticizer) | 5.0 |
| Azodicarbonamide (blowing agent) | 3.0 |
| Stabilizer (such as barium-cadmium fatty acid soap) | 3.0 |

This plastisol composition is cast on a release paper and gelled in an oven for a few minutes at a temperature of about 140 to 150° F. to produce a tack-free, gelled layer at room temperature. This flat, semi-rigid gell layer is then coated with rotogravure roll containing a particular design representing about 2 to 10 percent of the surface area with a thin layer of a commercial solvent-type vinyl ink composition to which has been added about 2 to 5 percent by weight of a cross-linking agent for the polyvinyl chloride resin such as azobisisobutyronitrile. The printed, gelled vinyl resin layer is then heated and expanded in an oven at a temperature of about 190 to 200° C. If desired a short time period of 5 to 30 minutes may be used prior to heating to permit penetration of the agent and solvent into the resin film. During expansion of the thin foam layer, full expansion is inhibited in those areas wherein the ink composition containing the cross-linking agent is applied, thereby creating a cellular sheet material having depressed or textured embossed areas. Substantially full expansion occurred in those surrounding areas wherein no cross-linking or hardening agent is applied.

Example 2

An embossed design is also created by calendering plasticized vinyl chloride resin particles admixed with a blowing agent into a thin sheet at a temperature below the decomposition temperature of the blowing agent as for example in U.S. Patent 2,964,799. A solution comprising an active vinyl resin solvent like tetrahydrofuran, or acetone and a cross-linking agent such as from 5 to 10 percent by weight of dicumyl peroxide is then applied to one surface of the calendered film in a particular design. The solution is allowed to penetrate for a short period of time to attain the desired depth of embossing, and then the sheet is heated to 185 to 195° C. to decompose the blowing agent and modify the resin in those coated areas. An embossed, cellular sheet material is produced with substantially full expansion occurring in the uncoated areas of the calendered sheet.

Example 3

A thin film 1 to 10 mils of polyethylene resin containing an embossed decorative design such as a decorative polyolefin ribbon is produced by treating the one surface of a thin sheet of polyethylene resin containing a blowing agent of 2 parts per 100 parts of resin of azodicarbonamide with an organic solution containing a cross-linking agent. The polyethylene film is prepared by extruding resin particles in admixture with the blowing agent through a heated, slotted die form at a temperature insufficient to decompose in a substantial manner the blowing agent. A methylethyl ketone solution containing 2 percent by weight of an organic peroxide cross-linking agent, e.g., dicumyl peroxide is applied in a particular design pattern to the surface of the film. The film is then gradually heated to a temperature of 200 to 220° C., whereupon the blowing agent decomposes and cross-linking of the resin occurs in the design areas. Expansion of the resin beneath the cross-linked surface areas is inhibited to produce a cellular, embossed effect on the cellular film.

Although my invention has been described in connection with cross-linking agents, any hardening agent may be used and applied to the plastic film surface. For example, an agent may be used which speeds up the solvating of a vinyl resin so as to make the resin film at particular areas fused prior to fusion of neighboring printed areas and, thereby, the change in expansion properties creates differing expansion in the film. With vinyl chloride resin esters or other organic solvents or plasticizers may be applied to the surface of a gelled or calendered polyvinyl chloride resin.

The plasticizer or solvent so applied is selected to have a higher solvating rate for the vinyl chloride resin in the layer than the plasticizer employed in the plastisol or organosol on the soft calendered film. In this embodiment the hardening agent may comprise a liquid plasticizer or solvent which permits the preferential and rapid fusing of the vinyl resin particles in a particular area to which the organic solvent or plasticizer is appled. In this manner the vinyl chloride resin will become more highly fused and, thus, more resistant to expansion in these particular areas. The organic solvent or plasticizer employed should have a preferential rate of absorption into the vinyl resin particles in comparison to the rate of the plasticizer at a similar temperature which has previously been employed. Those liquids which are active solvents for the particular plastic in the plastic layer may often be employed alone as a means of solvating and choosing the resin particles in that particular area prior to full expansion of the plastic layer. Typical plasticizers and their varying rates of solvating are well-known to those skilled in the art.

My discovery permits the chemical embossing, particularly of vinyl resin and polyolefin sheet material containing azodicarbonamide, in an easy and practical manner and avoids many of the difficulties associated with the prior art.

What I claim is:

1. A method for imparting an embossed appearance to a cellular polymeric sheet material which method comprises:

providing a gas expandable, gas retentive organoplastic polymeric sheet material containing a blowing agent which on heating, decomposes to expand the sheet material and form a cellular layer and a material which is capable, on exposure to radiation to modify the gas expansion properties of that portion of the sheet material so exposed;

irradiating with a beam from atomic and sub-atomic particles a preselected portion of the sheet material to modify said material in the irradiated portion of the sheet by cross-linking the resins of said gas retentive sheet material, said irradiation taking place at or below the temperature at which the blowing agent substantially decomposes to expand the sheet material; said irradiation being of sufficient time and intensity to alter the gas expansion properties of that portion of the sheet material so irradiated; and thereafter heating the irradiated sheet material to a temperature sufficient to decompose the blowing agent and form a cellular sheet material having an embossed appearance on its surface.

2. The method of claim 1, which includes incorporating into said sheet material an organic monomer or polymeric material which is subject to cross linking on exposure to said irradiation thereby inhibiting full expansion of the sheet material to said irradiated areas.

3. The method of claim 1 which includes incorporating in said sheet material a small amount sufficient to increase the hardness of the irradiated portion of the sheet material of a peroxide or an azo nitrile compound.

4. The method of claim 1 which includes imposing a radiation imperforate shield between said sheet material and the source of irradiation, said shield being in the shape of the embossing design thereon.

5. The method of claim 1 which includes incorporating in said sheet material a material which upon exposure to radiation increase the hardness of the irradiated portion, which material comprises styrene, acrylic, vinyl, and olefinic resins, and their monomeric components.

6. The method of claim 1 wherein said sheet material comprises a gelled vinyl chloride resin and includes azodicarbonamide as the blowing agent.

7. The method of claim 1 wherein said sheet material comprises an olefinic resin subject to hardening upon exposure to said radiation and which resin contains azodicarbonamide as the blowing agent.

8. The method of claim 1 wherein said sheet material comprises a vinyl resin, a plasticizer for said vinyl resin, and polymerizable monomer subject to hardening upon exposure to said radiation.

9. The product prepared by the method of claim 1.

References Cited

UNITED STATES PATENTS

| | | | |
|---|---|---|---|
| 2,825,282 | 3/1958 | Gergen et al. | 156—79 X |
| 2,964,799 | 12/1960 | Roggi et al. | 156—78 X |
| 3,293,094 | 12/1966 | Nairn et al. | 156—79 X |
| 3,293,108 | 12/1966 | Nairn et al. | 156—79 X |
| 3,365,353 | 1/1968 | Witman | 161—116 |
| 3,341,480 | 9/1967 | Field | 260—2.5 |

FOREIGN PATENTS

| | | |
|---|---|---|
| 716,366 | 9/1951 | Great Britain. |

OTHER REFERENCES

Schildknecht, C. E.: Polymer Processes, Interscience Publishers, Inc., New York City, 1956, pp. 12, 13 and 621.

EARL M. BERGERT, Primary Examiner.

C. B. COSBY, Assistant Examiner.

U.S. Cl. X.R.

156—79, 272; 260—25; 264—52, 48; 117—93.31, 38